United States Patent [19]

Fluegel

[11] 4,298,939
[45] Nov. 3, 1981

[54] METHOD AND APPARATUS FOR APPLYING A REGULATED VOLTAGE

[75] Inventor: Dale A. Fluegel, Bartlesville, Okla.

[73] Assignee: Phillips Petroleum Company, Bartlesville, Okla.

[21] Appl. No.: 955,732

[22] Filed: Oct. 30, 1978

[51] Int. Cl.³ .................. G05F 1/56; H03K 3/26; G01V 1/28

[52] U.S. Cl. .................... 364/421; 307/38; 323/349; 364/492

[58] Field of Search ............... 364/492, 421, 431; 323/22 T; 307/38, 130; 367/67, 76, 77, 8; 346/33 C

[56] References Cited

U.S. PATENT DOCUMENTS

| | | | |
|---|---|---|---|
| 3,062,315 | 11/1962 | Herzog | 367/77 |
| 3,188,567 | 6/1965 | Jackson | 325/113 X |
| 3,210,665 | 10/1965 | Street | 325/55 |
| 3,283,295 | 11/1966 | Montgomery | 367/77 |
| 3,431,552 | 3/1969 | Weeks et al. | 346/33 C |
| 3,755,686 | 8/1973 | Woods | 307/38 X |
| 3,786,344 | 1/1974 | Davis et al. | 323/22 T X |
| 3,806,864 | 4/1974 | Broding et al. | 346/33 C |
| 3,835,819 | 9/1974 | Anderson, Jr. | 364/431 X |
| 3,842,249 | 10/1974 | Geyer et al. | 364/492 |
| 3,883,725 | 5/1975 | Fort et al. | 364/421 X |
| 3,930,145 | 12/1975 | Fort et al. | 364/421 |
| 3,955,185 | 5/1976 | Nishimura | 340/324 R |
| 3,986,008 | 10/1976 | Fort et al. | 367/76 X |
| 3,987,406 | 10/1976 | Broding | 346/33 C |
| 3,991,726 | 11/1976 | Kawai et al. | 364/431 X |
| 4,017,833 | 4/1977 | Broding | 367/67 |
| 4,051,822 | 10/1977 | Yoshida | 364/431 X |
| 4,054,828 | 10/1977 | Conzelmann et al. | 323/22 T X |
| 4,055,794 | 10/1977 | Ickes et al. | 323/22 T |
| 4,143,283 | 3/1979 | Graf et al. | 307/130 X |

OTHER PUBLICATIONS

Dickey et al: Solid state switching for aircraft electric systems, IEEE Spectrum Nov. 1970, p. 73/79.
Geyer et al: Automatic Control of Aircraft Electrical System, Westinghouse Engineer, Jul. 1971, pp. 114-119.
Tremaine: (Textbook) Audio Cyclopedia 1969, pp. 1202-1209 of interest, Section: Power Supplies.

Primary Examiner—Felix D. Gruber

[57] ABSTRACT

A voltage regulation circuit is provided wherein a command from a computer is utilized to turn on a Darlington transistor pair. When the Darlington transistor pair is turned on, a power transistor is allowed to turn on which acts as a switch to supply a voltage to the input of a voltage regulator. In response to the voltage supplied to the input of the voltage regulator, the voltage regulator provides a regulated output voltage. In this manner a circuit is provided in which a regulated output voltage may be provided in response to a computer command.

22 Claims, 76 Drawing Figures

METHOD AND APPARATUS FOR APPLYING A REGULATED VOLTAGE

This invention relates to method and apparatus for supplying a regulated voltage. In a particular aspect, this invention relates to method and apparatus for supplying a regulated voltage in response to a computer command.

If a voltage is supplied directly from a battery or a battery pack, the voltage level may vary due to depletion of the charge of the battery caused by use of the battery, temperature of the battery or shelf life of the battery. Voltage regulation circuits are commonly utilized to maintain a constant voltage level even though the voltage level supplied from the battery or battery pack to the voltage regulation circuit may vary.

In many applications, it is desirable that a particular regulated voltage be supplied only when that particular regulated voltage is required for operation of a system. This substantially increases battery life and decreases the size of a battery or battery pack required for a particular system application. In systems which are under computer control, it is desirable that the computer be able to turn on a particular regulated voltage when that particular regulated voltage is required by the system. This allows the computer to effectively control a voltage regulation circuit which is capable of providing a plurality of different regulated voltages in such a manner that only the particular regulated voltages required by a system at a particular time are supplied from the voltage regulation circuit. It is thus an object of this invention to provide method and apparatus for supplying a regulated voltage in response to a computer command. It is a further object of this invention to provide electronic circuits capable of supplying a regulated voltage in response to a computer command.

In accordance with the present invention, method and apparatus is provided whereby a regulated voltage is provided in response to a computer command. A command from a computer is utilized to turn on a Darlington transistor pair. When the Darlington transistor pair turns on, a power transistor is allowed to turn on which enables a current to be supplied to a voltage regulator. In response to the current supplied to the voltage regulator, the voltage regulator provides a regulated voltage. The capability of providing a plurality of regulated voltages which have different voltage levels and which may have either positive or negative values is also provided.

Other objects and advantages of the invention will be apparent from the detailed description of the invention and the appended claims as well as from the detailed description of the drawings in which:

Figure 1:
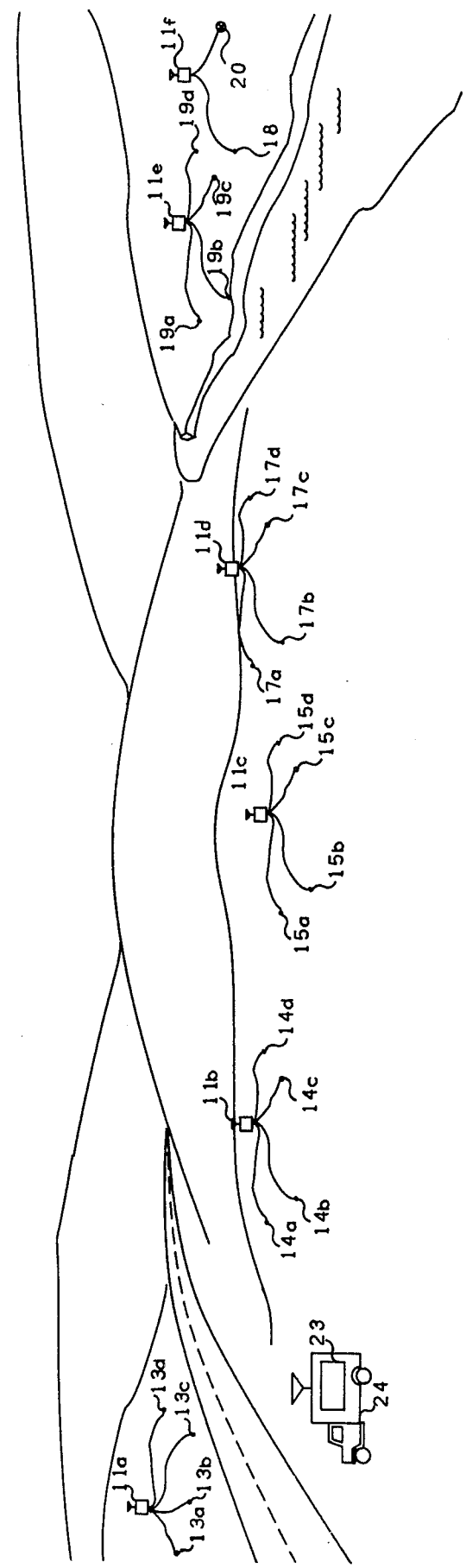
FIG. 1 is an illustration of a possible physical arrangement of the components of a seismic exploration system.
Figure 2A:
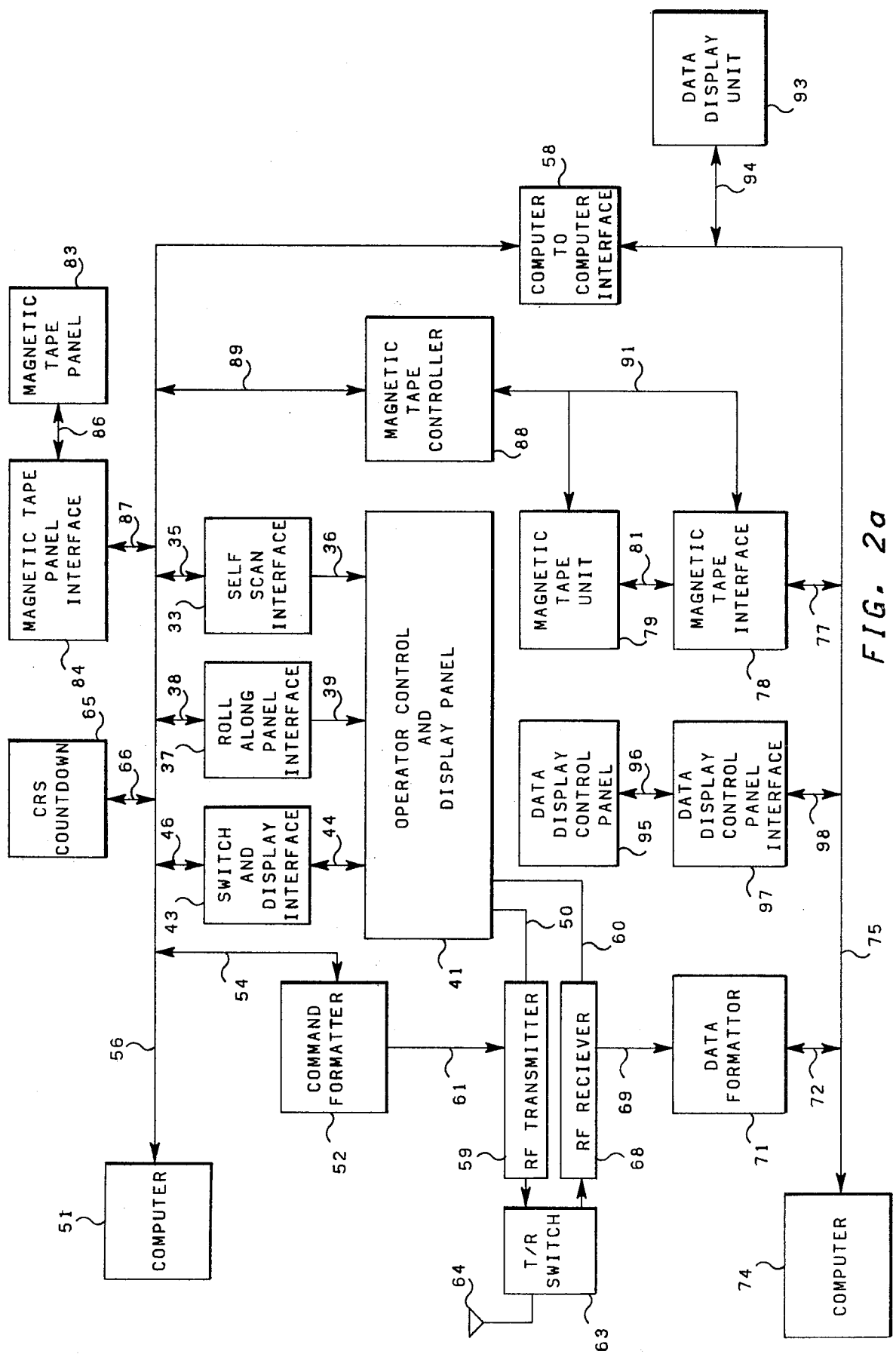
FIG. 2a is a block diagram of a central recording station.
Figure 2B:
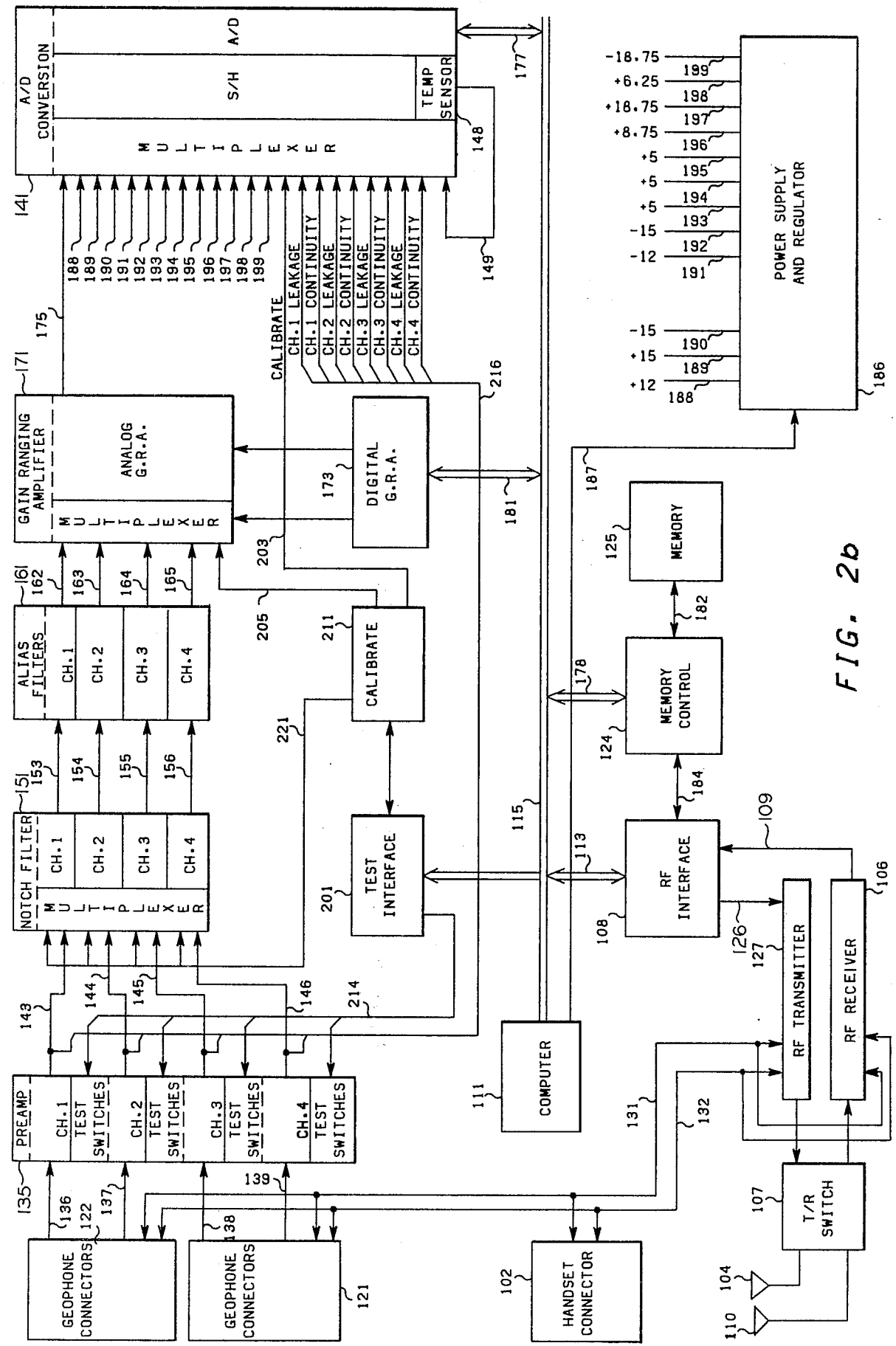
FIG. 2b is a block diagram of a remote telemetry unit.
Figure 21:
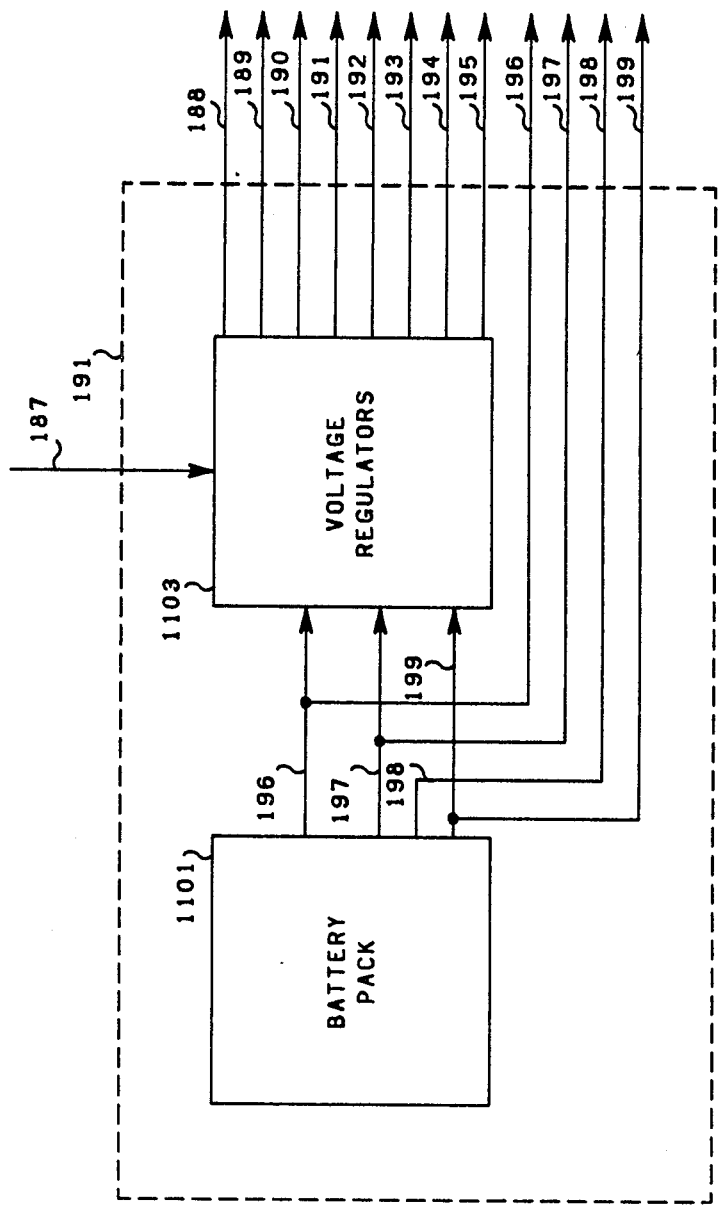
FIG. 21 is a block diagram of the power supply regulator illustrated in FIG. 2b.
Figure 22A:
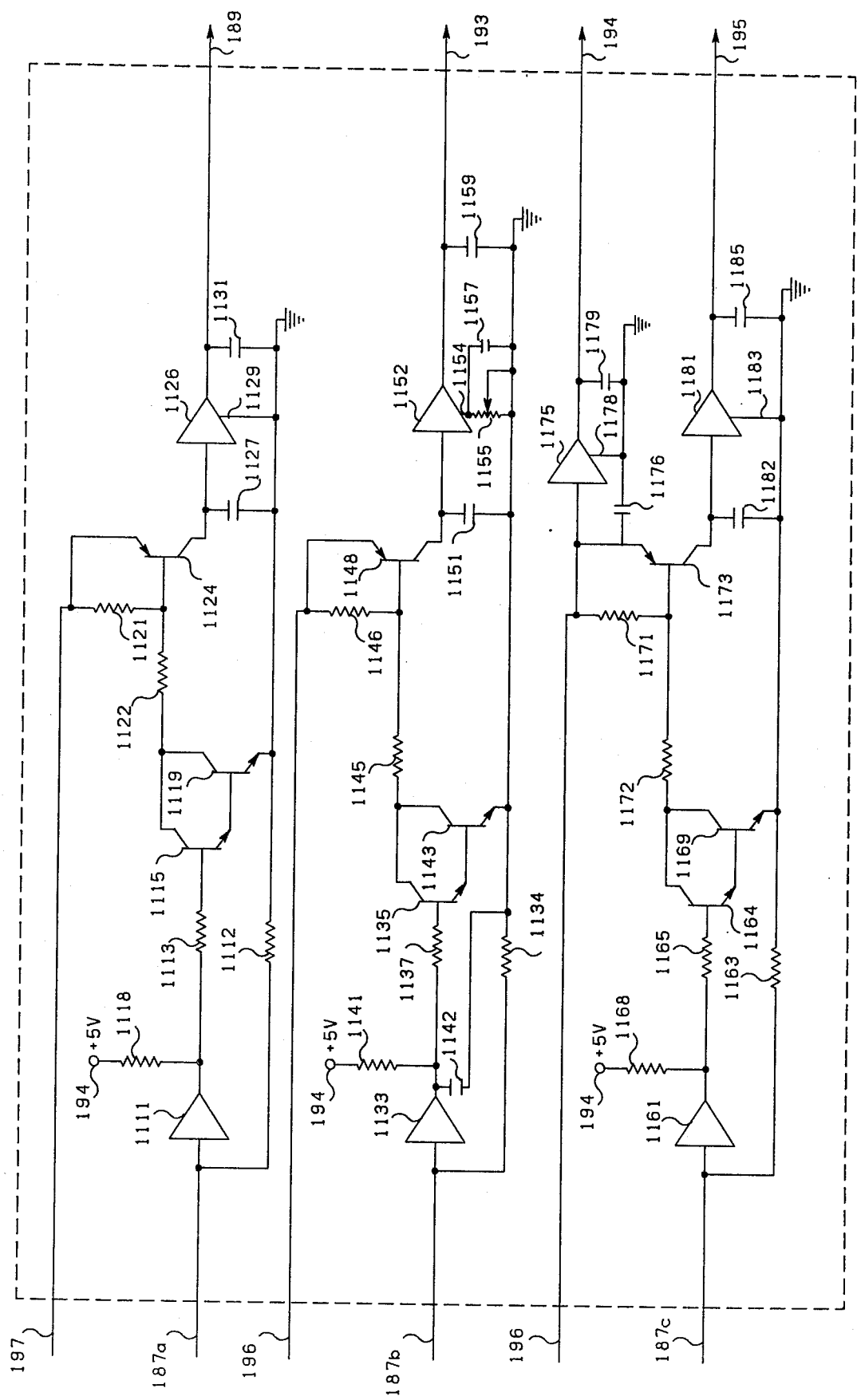
FIGS. 22a and 22b are schematics of the voltage regulators illustrated in FIG. 21.
Figure 22B:
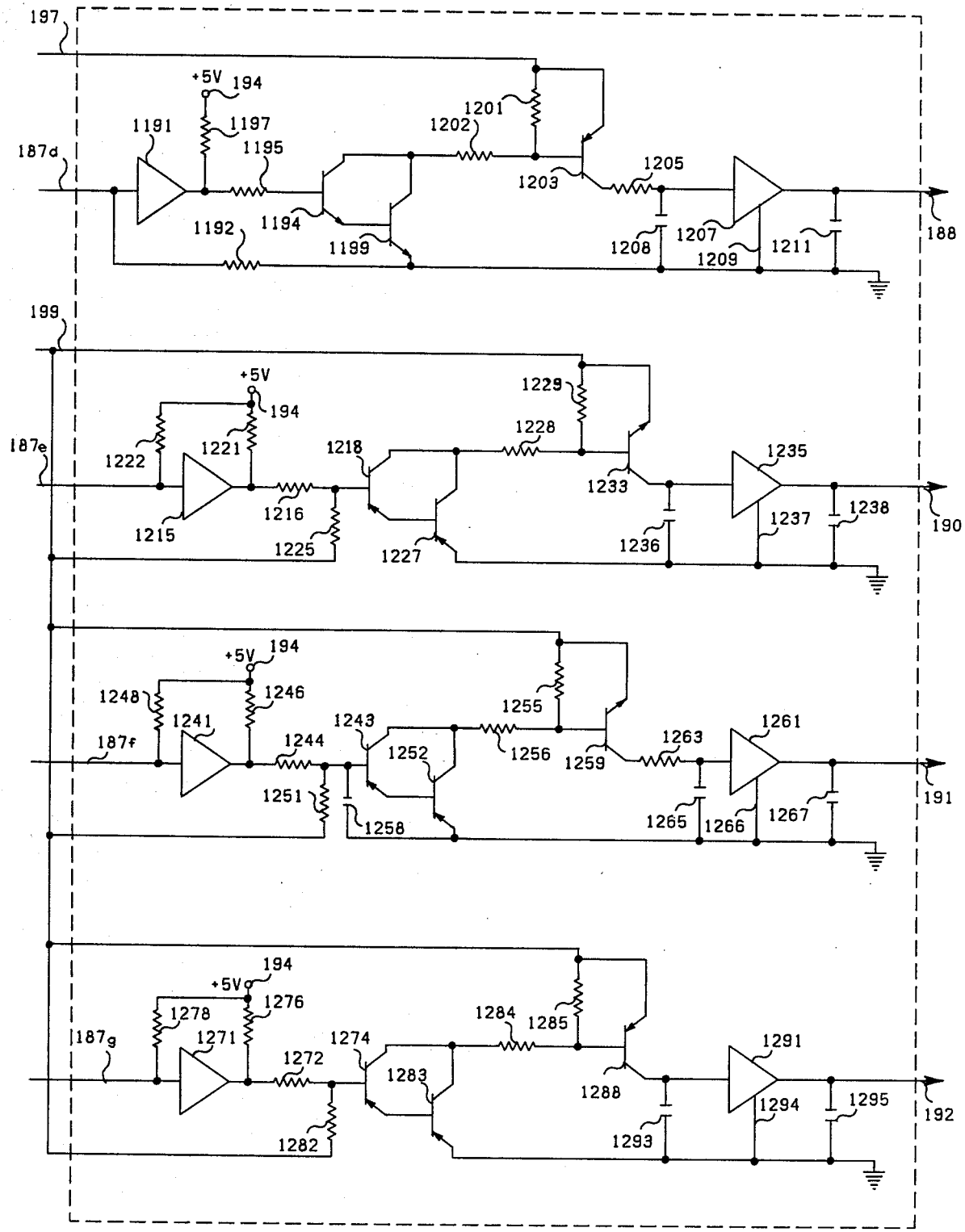

FIGS. 3-20 and 23-73 of application Ser. No. 955,905, filed Oct. 30, 1978, by Robert H. Lacy are hereby incorporated by reference. The brief description of FIGS. 3-20 and 23-73 in application Ser. No. 955,905 is also hereby incorporated by reference.

The invention is described in terms of a seismic exploration system which requires a plurality of regulated voltages for operation of the system. However, it is noted that the invention is not limited to a seismic exploration system but is rather applicable to any system in which it is desired to enable a voltage regulation circuit in response to a computer command.

The invention is also described in terms of a specific computer system and in terms of specific circuit components. However, it should be noted that there are many different types of computer systems which could supply the required command and there are many different types of circuit components which are supplied by a plurality of manufacturers which could be utilized in the voltage regulation circuits of the present invention.

The detailed description of the drawings and the Appendix of application Ser. No. 955,905, filed Oct. 30, 1978, by Robert H. Lacy, are hereby incorporated by reference.

That which is claimed is:

1. A seismic system for geophysical exploration comprising:
a plurality of remote geophone monitoring means, each of said remote geophone monitoring means being adapted to receive electrical signals from at least one geophone means; and
a central control means for generating electrical signals for initiating the operation of said plurality of remote geophone monitoring means;
said central control means comprising:
means for transmitting commands to said plurality of remote geophone monitoring means; and
means for receiving data from said plurality of remote geophone monitoring means;
each of said plurality of remote geophone monitoring means comprising:
means for sampling electrical signals, provided from at least one geophone means, and for converting the sampled electrical signals into digital seismic data;
means for transmitting said digital seismic data to said central control means;
means for receiving commands from said central control means;
a computer means; and
means for supplying power;
said means for supplying power comprising:
a transistor switch;
a voltage regulator means having an input and an output, said voltage regulator means providing a regulated voltage at said output in response to an electrical current being supplied to said voltage regulator means;
means for supplying a binary signal from said computer means to said transistor switch; and
means for supplying an electrical current flow to said voltage regulator means only when said transistor switch is turned on by the binary signal from said computer means.

2. Apparatus in accordance with claim 1 wherein said transistor switch comprises a Darlington transistor pair and a power transistor, the collector of said Darlington transistor pair being electrically connected to the base of said power transistor.

3. Apparatus comprising:
a computer means;
a transistor switch;

a voltage regulator means having an input and an output, said voltage regulator means providing a regulated voltage at said output in response to an electrical current being supplied to said voltage regulator means;

means for supplying a binary signal from said computer means to said transistor switch; and means for supplying an electrical current flow to said voltage regulator means only when said transistor switch is turned on by the binary signal from said computer means.

4. Apparatus in accordance with claim 3 wherein said transistor switch comprises a Darlington transistor pair and a power transistor, the collector of said Darlington transistor pair being electrically connected to the base of said power transistor.

5. A seismic system for geophysical exploration comprising:

a plurality of remote geophone monitoring means, each of said remote geophone monitoring means being adapted to receive electrical signals from at least one geophone means; and a central control means for generating electrical signals for initiating the operation of said plurality of remote geophone monitoring means;

said central control means comprising:

means for transmitting commands to said plurality of remote geophone monitoring means; and means for receiving data from said plurality of remote geophone monitoring means;

each of said plurality of remote geophone monitoring means comprising:

means for sampling electrical signals, provided from at least one geophone means, and for converting the sampled electrical signals into digital seismic data;

means for transmitting said digital seismic data to said central control means;

means for receiving commands from said central control means;

a computer means; and means for supplying power;

said means for supplying power comprising:

a buffer amplifier means;

means for supplying a binary signal from said computer means to the input of said buffer amplifier means;

a Darlington transistor pair;

means for electrically connecting the output of said buffer amplifier means to the base of said Darlington transistor pair;

a first power supply means;

a first resistive element;

means for electrically connecting the output of said first power supply through said first resistive element to said means for electrically connecting the output of said buffer amplifier means to the base of said Darlington transistor pair, said Darlington transistor pair being turned on when said binary signal from said computer means has a desired logic state;

means for electrically grounding the emitter of said Darlington transistor pair;

a power transistor;

means for electrically connecting the collector of said Darlington transistor pair to the base of said power transistor;

a second power supply means;

a second resistive element;

means for electrically connecting the output of said second power supply means through said second resistive element to said means for electrically connecting the collector of said Darlington transistor pair to the base of said power transistor;

means for electrically connecting the output of said second power supply means to the emitter of said power transistor;

a voltage regulator means; and means for electrically connecting the collector of said power transistor to the input of said voltage regulator means, said power transistor being turned on when said Darlington transistor pair is turned on to thereby enable current flow to said voltage regulator means, said voltage regulator means providing a regulated voltage in response to the electrical current supplied to said voltage regulator means.

6. Apparatus in accordance with claim 5 wherein said desired logic level for the binary signal from said computer means is a high logic level, said first power supply supplies a positive voltage, said second power supply supplies a positive voltage, said Darlington transistor pair is an NPN Darlington transistor pair, said power transistor is a PNP power transistor, and said regulated voltage is a positive voltage.

7. Apparatus in accordance with claim 5 wherein said desired logic level for the binary signal from said computer means is a low logic level, said first power supply supplies a negative voltage level, said second power supply supplies a negative voltage level, said Darlington transistor pair is a PNP Darlington transistor pair, said power transistor is an NPN power transistor, and said regulated voltage has a negative voltage level.

8. Apparatus comprising:

a computer means;

a buffer amplifier means;

means for supplying a binary signal from said computer means to the input of said buffer amplifier means;

a Darlington transistor pair;

means for electrically connecting the output of said buffer amplifier means to the base of said Darlington transistor pair;

a first power supply means;

a first resistive element;

means for electrically connecting the output of said first power supply through said first resistive element to said means for electrically connecting the output of said buffer amplifier means to the base of said Darlington transistor pair, said Darlington transistor pair being turned on when said binary signal from said computer means has a desired logic state;

means for electrically grounding the emitter of said Darlington transistor pair;

a power transistor;

means for electrically connecting the collector of said Darlington transistor pair to the base of said power transistor;

a second power supply means;

a second resistive element;

means for electrically connecting the output of said second power supply means through said resistive element to said means for electrically connecting the collector of said Darlington transistor pair to the base of said power transistor;

means for electrically connecting the output of said second power supply means to the emitter of said power transistor;

a voltage regulator means; and means for electrically connecting the collector of said power transistor to the input of said voltage regulator means, said power transistor being turned on when said Darlington transistor pair is turned on to thereby enable current to flow to said voltage regulator means, said voltage regulator means providing a regulated voltage in response to the electrical current supplied to said voltage regulator means.

9. Apparatus in accordance with claim 8 wherein said desired logic level for the binary signal from said computer means is a high logic level, said first power supply supplies a positive voltage, said second power supply supplies a positive voltage, said Darlington transistor pair is an NPN Darlington transistor pair, said power transistor is a PNP power transistor, and said regulated voltage is a positive voltage.

10. Apparatus in accordance with claim 8 wherein said desired logic level for the binary signal from said computer means is a low logic level, said first power supply supplies a negative voltage level, said second power supply supplies a negative voltage level, said Darlington transistor pair is a PNP Darlington transistor pair, said power transistor is an NPN power transistor, and said regulated voltage has a negative voltage level.

11. A method for supplying a regulated voltage to a computer controlled remote geophone monitoring means which is being used to acquire seismic data, a central control means being utilized to control and acquire data from a plurality of remote geophone monitoring means, comprising the steps of:
actuating a transistor switch from a first state to a second state in response to a binary signal from the computer controlling said remote geophone monitoring means;
enabling an electrical current to be supplied to a voltage regulator means during the occurrence of said second state; and
providing a regulated voltage from said voltage regulator means in response to said electrical current being supplied to said voltage regulator means.

12. A method in accordance with claim 11 wherein said transistor switch comprises a Darlington transistor pair and a power transistor, the collector of said Darlington transistor pair being electrically connected to the base of said power transistor.

13. A method in accordance with claim 12 wherein said steps of actuating said transistor switch into said second state and enabling an electrical current to be supplied to said voltage regulator means comprises:
supplying the binary signal from said computer to the input of a buffer amplifier;
supplying a first voltage through a first resistive element to thereby supply a first electrical current flow to the output of said buffer amplifier and to the base of said Darlington transistor pair, said first electrical current flowing to the output of said buffer amplifier when the output of said buffer amplifier is low, said first electrical current flowing to the base of said Darlington transistor pair to thereby turn on said Darlington transistor pair when the output of said buffer amplifier is high;
supplying a second voltage level through a second resistive element to thereby provide a second electrical current flow to the base of said power transistor and to the collector of said Darlington transistor pair through the electrical connection between the base of said power transistor and the collector of said Darlington transistor pair; and
supplying said second voltage level to the emitter of said power transistor, said second electrical current flow being provided to ground through said Darlington transistor pair when said Darlington transistor pair is turned on to thereby turn on said power transistor to enable current to flow through said power transistor to the input of said voltage regulator means.

14. A method in accordance with claim 13 wherein said Darlington transistor pair is an NPN Darlington transistor pair, said power transistor is a PNP power transistor, said first voltage level is positive, said second voltage level is positive, and said regulated voltage is positive.

15. A method in accordance with claim 12 wherein said steps of actuating said transistor switch into said second state and enabling an electrical current to be supplied to said voltage regulator means comprises:
supplying the binary signal from said computer to the input of a buffer amplifier; and
enabling electrical current to flow from the output of said buffer amplifier to a first power supply when the output of said buffer amplifer is high and enabling electrical current to flow from the base of said Darlington transistor pair to said first power supply when the output of said buffer amplifier is low to thereby turn on said Darlington transistor pair, said power transistor being turned on when said Darlington transistor pair is turned on to thereby enable electrical current to flow from a second power supply through said voltage regulator means to enable said voltage regulator means to provide a regulated voltage.

16. A method in accordance with claim 15 wherein said Darlington transistor pair is a PNP Darlington transistor pair, said power transistor is an NPN power transistor, said first power supply supplies a negative voltage level, said second power supply supplies a negative voltage level, and said regulated voltage is negative.

17. A method for supplying a regulated voltage in response to a binary signal from a computer comprising the steps of:
actuating a transistor switch from a first state to a second state in response to a binary signal from a computer;
enabling an electrical current to be supplied to a voltage regulator means during the occurrence of said second state; and
providing a regulated voltage from said voltage regulator means in response to said electrical current being supplied to said voltage regulator means.

18. A method in accordance with claim 17 wherein said transistor switch comprises a Darlington transistor pair and a power transistor, the collector of said Darlington transistor pair being electrically connected to the base of said power transistor.

19. A method in accordance with claim 18 wherein said steps of actuating said transistor switch into said second state and enabling an electrical current to be supplied to said voltage regulator means comprises:
supplying the binary signal from said computer to the input of a buffer amplfier;
supplying a first voltage through a first resistive element to thereby supply a first electrical current flow to the output of said buffer amplifier and to the base of said Darlington transistor pair, said first electrical current flowing to the output of said buffer amplifier when the output of said buffer amplifier is low, said first electrical current flowing to the base of said Darlington transistor pair to thereby turn on said Darlington transistor pair when the output of said buffer amplifier is high;

supplying a second voltage level through a second resistive element to thereby provide a second electrical current flow to the base of said power transistor and to the collector of said Darlington transistor pair through the electrical connection between the base of said power transistor and the collector of said Darlington transistor pair; and supplying said second voltage level to the emitter of said power transistor, said second electrical current flow being provided to ground through said Darlington transistor pair when said Darlington transistor pair is turned on to thereby turn on said power transistor to enable current to flow through said power transistor to the input of said voltage regulator means.

20. A method in accordance with claim 19 wherein said Darlington transistor pair is an NPN Darlington transistor pair, said power transistor is a PNP power transistor, said first voltage level is positive, said second voltage level is positive, and said regulated voltage is positive.

21. A method in accordance with claim 18 wherein said steps of actuating said transistor switch into said second state and enabling an electrical current to be supplied to said voltage regulator means comprises:

supplying the binary signal from said computer to the input of a buffer amplifier; and enabling electrical current to flow from the output of said buffer amplifier to a first power supply when the output of said buffer amplifier is high and enabling electrical current to flow from the base of said Darlington transistor to said first power supply when the output of said buffer amplifier is low to thereby turn on said Darlington transistor pair, said power transistor being turned on when said Darlington transistor pair is turned on to thereby enable electrical current to flow from a second power supply through said voltage regulator means to enable said voltage regulator means to provide a regulated voltage.

22. A method in accordance with claim 21 wherein said Darlington transistor pair is a PNP Darlington transistor pair, said power transistor is an NPN power transistor, said first power supply supplies a negative voltage level, said second power supply supplies a negative voltage level, and said regulated voltage is negative.

* * * * *